US012803816B2

(12) United States Patent
Hu et al.

(10) Patent No.: US 12,803,816 B2
(45) Date of Patent: Nov. 17, 2026

(54) CROSS-BORDER AUTHENTICATION, CORPORATE ESTABLISHMENT AND DIGITAL ASSET MANAGEMENT SYSTEM

(71) Applicants: Jinqian Hu, Hangzhou (CN); Xixin Technology Co., Ltd, Hangzhou (CN); Xilian Technology Co., Ltd, Hangzhou (CN)

(72) Inventors: Jinqian Hu, Hangzhou (CN); Ai Guo, Hangzhou (CN)

(73) Assignees: Jinqian Hu, Hangzhou (CN); Xixin Technology Co., Ltd, Hangzhou (CN); Xilian Technology Co., Ltd, Hangzhou (CN)

( * ) Notice: Subject to any disclaimer, the term of this patent is extended or adjusted under 35 U.S.C. 154(b) by 107 days.

(21) Appl. No.: 18/983,303

(22) Filed: Dec. 16, 2024

(65) Prior Publication Data

US 2026/0058823 A1 Feb. 26, 2026

(30) Foreign Application Priority Data

Aug. 21, 2024 (CN) ......................... 202411150631.1

(51) Int. Cl.
*H04L 29/00* (2006.01)
*H04L 9/08* (2006.01)
*H04L 9/32* (2006.01)

(52) U.S. Cl.
CPC .......... *H04L 9/3247* (2013.01); *H04L 9/0819* (2013.01); *H04L 9/3231* (2013.01); *H04L 9/3263* (2013.01)

(58) Field of Classification Search
CPC ... H04L 9/3247; H04L 9/0819; H04L 9/3231; H04L 9/3263; H04L 63/083; H04L 9/50; H04L 63/0861
See application file for complete search history.

(56) References Cited

U.S. PATENT DOCUMENTS

2025/0211583 A1* 6/2025 Hu ...................... H04L 63/0823

FOREIGN PATENT DOCUMENTS

CN 117834147 * 12/2023

* cited by examiner

*Primary Examiner* — Jeffrey C Pwu
*Assistant Examiner* — Helai Salehi
(74) *Attorney, Agent, or Firm* — Yuhao Liang

(57) ABSTRACT

A cross-border authentication, corporate establishment and digital asset management system includes an information acquisition module configured to acquire user identity information, corporate information, corporate codes, domestic digital asset information and overseas digital asset information; a certificate key acquisition module configured to acquire domestic CA certificates, domestic keys, overseas CA certificates and overseas keys; an information authentication module configured to perform digital authentication on the identity information, corporate information and domestic digital asset information to generate authenticated identity information, authenticated corporate information and authenticated domestic digital asset information, and on the overseas digital asset information to generate authenticated overseas digital asset information; an electronic seal/electronic common seal/handwritten electronic signature generation module configured to generate an electronic seal, an electronic common seal and a handwritten electronic signature of the user; an authorization module configured to allow the user to call electronic seal, electronic common seal and handwritten electronic signature after authorization.

8 Claims, 5 Drawing Sheets

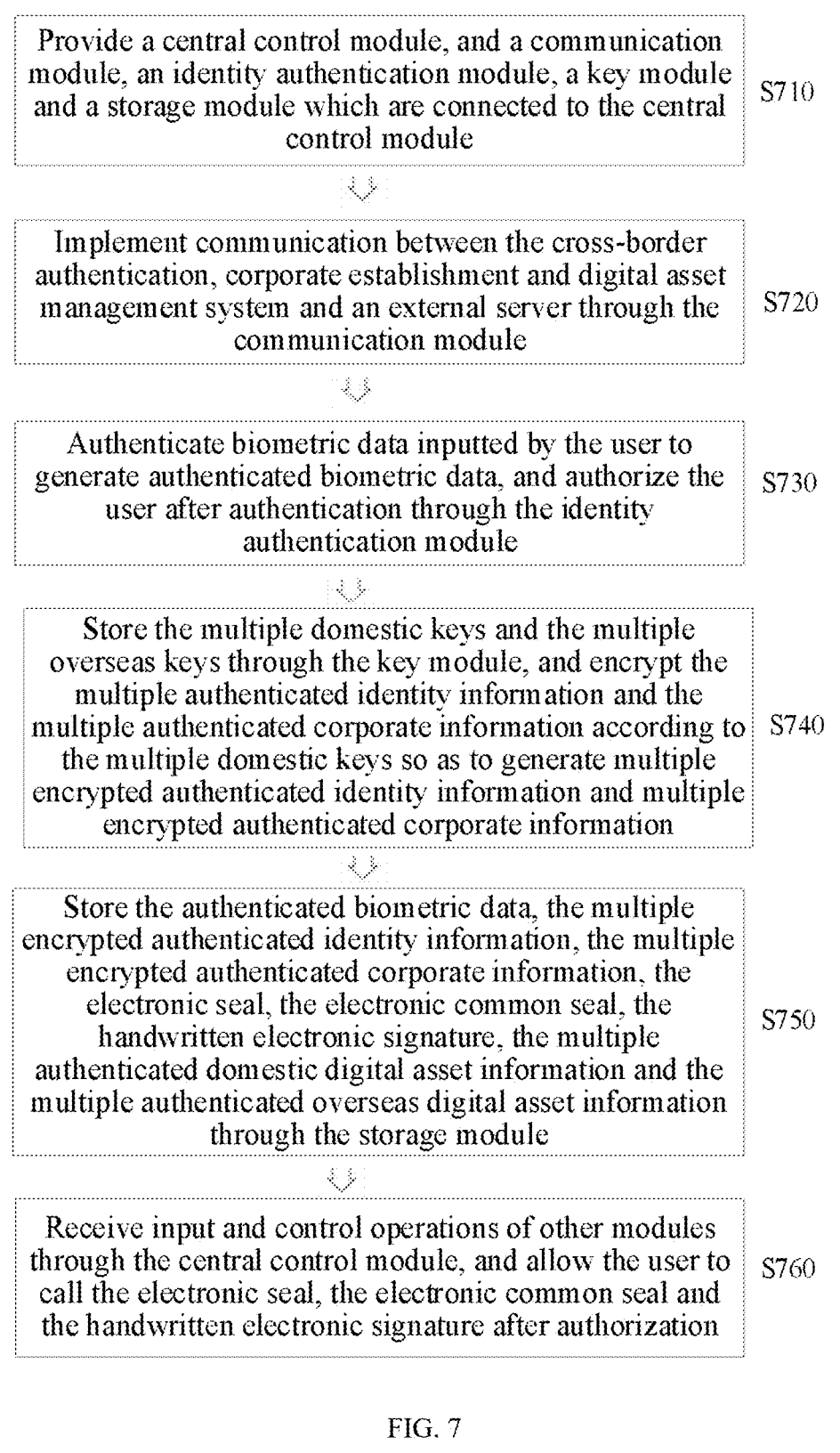

Provide a central control module, and a communication module, an identity authentication module, a key module and a storage module which are connected to the central control module S710

↓

Implement communication between the cross-border authentication, corporate establishment and digital asset management system and an external server through the communication module S720

↓

Authenticate biometric data inputted by the user to generate authenticated biometric data, and authorize the user after authentication through the identity authentication module S730

↓

Store the multiple domestic keys and the multiple overseas keys through the key module, and encrypt the multiple authenticated identity information and the multiple authenticated corporate information according to the multiple domestic keys so as to generate multiple encrypted authenticated identity information and multiple encrypted authenticated corporate information S740

↓

Store the authenticated biometric data, the multiple encrypted authenticated identity information, the multiple encrypted authenticated corporate information, the electronic seal, the electronic common seal, the handwritten electronic signature, the multiple authenticated domestic digital asset information and the multiple authenticated overseas digital asset information through the storage module S750

↓

Receive input and control operations of other modules through the central control module, and allow the user to call the electronic seal, the electronic common seal and the handwritten electronic signature after authorization S760

FIG. 7

CROSS-BORDER AUTHENTICATION, CORPORATE ESTABLISHMENT AND DIGITAL ASSET MANAGEMENT SYSTEM

CROSS-REFERENCE TO RELATED APPLICATION

This application claims priority of Chinese Patent Application No. 202411150631.1, filed on Aug. 21, 2024, the entire contents of which are incorporated herein by reference.

FIELD OF THE INVENTION

The present invention relates to the technical field of information security, and specifically relates to a cross-border authentication, corporate establishment and digital asset management system and method.

BACKGROUND OF THE INVENTION

With the national Belt and Road Initiative, many excellent corporates are exploring to expand business to the global market while meeting domestic demand. However, with the rapid development of digital economy, there are still many problems such as inconsistent elements, duplicate authentication, and inconsistent service standards in terms of cross-regional, cross-field and even globalization of corporates.

Therefore, there is an urgent need for those skilled in the art to develop a cross-border authentication, corporate establishment and digital asset management system and method that can effectively solve the problems of security concerns, inconvenient operation, and element barriers, so as to create an integrated platform from authentication, credit enhancement, credit investigation to credibility, and realize full life cycle management of domestic and overseas digital assets of governments, corporates, families, and individuals.

It is to be noted that the above introduction of the technical background is only for the purpose of facilitating a clear and complete explanation of the technical solution of the present invention and facilitating the understanding of those skilled in the art. These solutions should not be considered to be known to those skilled in the art simply because they are described in the background of the present invention.

SUMMARY OF THE INVENTION

In order to overcome the defects in the prior art, the embodiment of the present invention provides a cross-border authentication, corporate establishment and digital asset management system and method.

An embodiment of the present invention discloses a cross-border authentication, corporate establishment and digital asset management system, including: an information acquisition module configured to acquire multiple user identity information, multiple corporate information, corporate codes, multiple domestic digital asset information and multiple overseas digital asset information; a certificate key acquisition module configured to acquire multiple domestic CA certificates and multiple domestic keys provided by multiple domestic institutions, multiple overseas CA certificates and multiple overseas keys provided by multiple overseas institutions; an information authentication module configured to carry out digital authentication on the multiple identity information, the multiple corporate information and the multiple domestic digital asset information according to the multiple domestic CA certificates and the multiple domestic keys so as to generate multiple authenticated identity information, multiple authenticated corporate information and multiple authenticated domestic digital asset information, and carry out digital authentication on the multiple overseas digital asset information according to the multiple overseas CA certificates and the multiple overseas keys to generate multiple authenticated overseas digital asset information; an electronic seal/electronic common seal/handwritten electronic signature generation module configured to generate an electronic seal, an electronic common seal and a handwritten electronic signature of the user according to the multiple authenticated identity information and the multiple authenticated corporate information; and an authorization module configured to allow the user to call the electronic seal, the electronic common seal and the handwritten electronic signature after authorization.

Further, the cross-border authentication, corporate establishment and digital asset management system further includes: a multi-language support module which is configured to support language transformation of multiple languages; the information authentication module generates the multiple authenticated identity information, the multiple authenticated corporate information and the multiple authenticated domestic digital asset information by a first language, and generates the multiple authenticated identity information, the multiple authenticated corporate information and the multiple authenticated overseas digital asset information by a second language; and the second language is different from the first language.

Further, on the premise that the first language serves as an overseas official general language, the first language can be adopted to generate multiple authenticated identity information, multiple authenticated corporate information and multiple authenticated overseas digital asset information for overseas use.

Further, the multi-language support module supports the first language, the second language, a third language, a fourth language and the like and can be suitable for all overseas official languages.

Further, the multi-language support module also support languages of different nations and can be suitable for all domestic official languages.

Further, the "cross-border", "domestic" and "overseas" in the present invention refer to narrow national border division and can be generalized to be understood as regions divided through languages, that is, the "cross-border" can be understood as a "cross-language region", the "domestic" can be understood as a "same-language region", and the "overseas" can be understood as a "different-language region".

Further, the electronic seal/electronic common seal/handwritten electronic signature generation module adopts the first language to generate an electronic seal, an electronic common seal and a handwritten electronic signature corresponding to the first language, and adopts the second language to generate an electronic seal, an electronic common seal and a handwritten electronic signature corresponding to the second language.

Further, the electronic seals and the electronic common seals are not limited to the styles of the electronic seals and also include digital signatures, digital special seals and the like, that is, the electronic seals and the electronic common seals include various digital signatures, digital special seals and the like which can be used for identifying and confirming the identity and qualification of an electronic file signer and the authenticity of an electronic file.

Further, the handwritten electronic signatures include various handwritten electronic signatures which can be used for identifying and confirming the identity and qualification of the electronic file signer and the authenticity of the electronic file.

Further, when the user makes an application request corresponding to the first language, the authorization module allows the user to call the electronic seal, the electronic common seal and the handwritten electronic signature corresponding to the first language after the user is authorized, so that domestic corporate establishment is realized, and the multiple authenticated domestic digital asset information is acquired through the electronic seal, the electronic common seal and the handwritten electronic signature corresponding to the first language; and when the user makes an application request corresponding to the second language, the authorization module allows the user to call the electronic seal, the electronic common seal and the handwritten electronic signature corresponding to the second language after the user is authorized, so that overseas corporate establishment is realized, and the multiple authenticated overseas digital asset information is acquired through the electronic seal, the electronic common seal and the handwritten electronic signature corresponding to the second language.

Further, the multiple domestic digital asset information comprises domestic electronic currency, domestic encrypted currency, domestic non-fungible token, domestic house property certificates and domestic electronic securities corresponding to the first language; and the multiple overseas digital asset information comprises overseas electronic currency, overseas encrypted currency, overseas non-fungible token, overseas house property certificates and overseas electronic securities corresponding to the second language.

Further, an IPv6 acquisition module, configured to acquire an IPv6 digital address of the user, wherein the IPv6 digital address comprises multiple groups of 16-bit address fragments; and a binding module which is coupled to the information acquisition module and the IPv6 acquisition module and configured to bind the corporate codes with the IPv6 digital address.

Further, the cross-border authentication, corporate establishment and digital asset management system further comprises a multi-module. the multi-module comprises: a central control module, and a communication module, an identity authentication module, a key module and a storage module which are connected to the central control module; the communication module is configured to implement communication between the cross-border authentication, corporate establishment and digital asset management system and an external server; the identity authentication module is configured to authenticate biometric data inputted by the user to generate authenticated biometric data, and authorize the user after authentication; the key module is configured to store the multiple domestic keys and the multiple overseas keys, and encrypt the multiple authenticated identity information and the multiple authenticated corporate information according to the multiple domestic keys and the multiple overseas keys so as to generate multiple encrypted authenticated identity information and multiple encrypted authenticated corporate information; the storage module is configured to store the authenticated biometric data, the multiple encrypted authenticated identity information, the multiple encrypted authenticated corporate information, the electronic seal, the electronic common seal, the handwritten electronic signature, the multiple authenticated domestic digital asset information and the multiple authenticated overseas digital asset information; and the central control module is configured to receive input and control operations of other modules, and allow the user to call the electronic seal, the electronic common seal and the handwritten electronic signature after authorization.

An embodiment of the present invention also discloses a cross-border authentication, corporate establishment and digital asset management method, and comprising the following steps: providing the cross-border authentication, corporate establishment and digital asset management system, wherein the cross-border authentication, corporate establishment and digital asset management system comprises an information acquisition module, a certificate key acquisition module, an information authentication module, an electronic seal/electronic common seal/handwritten electronic signature generation module and an authorization module; acquiring multiple user identity information, multiple corporate information, corporate codes, multiple domestic digital asset information and multiple overseas digital asset information through the information acquisition module; acquiring multiple domestic CA certificates and multiple domestic keys provided by multiple domestic institutions, multiple overseas CA certificates and multiple overseas keys provided by multiple overseas institutions through the certificate key acquisition module; carrying out digital authentication on the multiple identity information, the multiple corporate information and the multiple domestic digital asset information according to the multiple domestic CA certificates and the multiple domestic keys through the information authentication module so as to generate multiple authenticated identity information, multiple authenticated corporate information and multiple authenticated domestic digital asset information, and carrying out digital authentication on the multiple overseas digital asset information according to the multiple overseas CA certificates and the multiple overseas keys to generate multiple authenticated overseas digital asset information; generating an electronic seal, an electronic common seal and a handwritten electronic signature of the user according to the multiple authenticated identity information and the multiple authenticated corporate information through the electronic seal/electronic common seal/handwritten electronic signature generation module; and allowing the user to call the electronic seal, the electronic common seal and the handwritten electronic signature after authorization through the authorization module.

The present invention can not only achieve cross-border authentication, but also achieve cross-border registration and cross-border corporate establishment at the same time. According to the cross-border authentication, corporate establishment and digital asset management system of the present invention, through a global authentication mode (including domestic and overseas), on the premise of conforming to domestic and overseas laws and regulations, through one-stop editing and submitting of registration information in the system, a corporate establishment requirements corresponding to national authentication system and domestic market supervision and management can be automatically implemented at the background, and one-stop authentication and auditing for corporate establishment are completed. After a corporate completes registration and establishment, various authentication element information of the corporate is utilized to be intensive to a domestic standard full-element credit seal, and then one seal for all of the corporate can be achieved.

By means of the above technical solution, the present invention has the beneficial effects that: compared with the prior art, the cross-border authentication, corporate establishment and digital asset management system and method provided by the present invention have the advantages that: (1) through realizing full-element information filling in the establishment stage, the rules and technical capabilities conforming to global market subject authentication and license issuing are fused, and thus intensive authentication work of domestic cross-department and overseas cross-region is completed in the one-stop manner; (2) domestic and overseas multi-certificate and multi-key application issuing can be completed on a single platform through one-time authentication; (3) cross-border registration can be realized, and domestic corporate establishment and overseas corporate establishment can be completed in the one-stop manner; and (4) through unified management of the domestic digital assets and the overseas digital assets, intensive management of corporate credit element information and digital asset information is completed, and the accumulation and right authentication of the digital assets are completed. In other words, the cross-border authentication, corporate establishment and digital asset management system according to the present invention not only can meet rule adaptation of authentication requirements in different legal environments, but also can adapt to signature habits required by different language users for protocol signing, can help the corporates to efficiently communicate with overseas business partners, and realizes low-cost cross-border signing.

BRIEF DESCRIPTION OF THE DRAWINGS

FIG. 7 is a flowchart of a cross-border authentication, corporate establishment and digital asset management method in an Embodiment 4 of the present invention.

Figure 1:
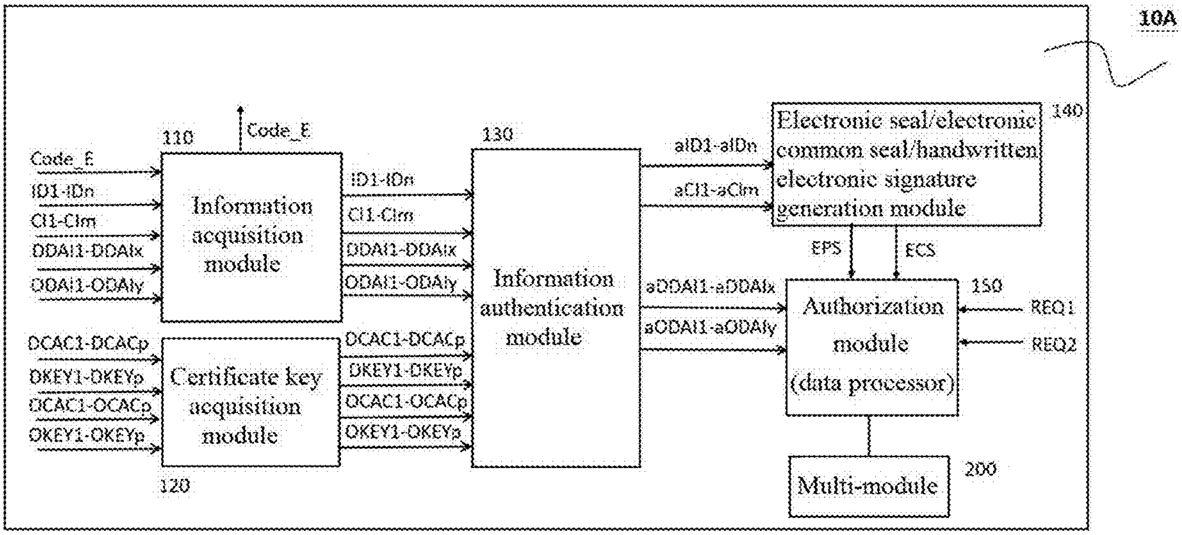
FIG. 1 is a frame diagram of a cross-border authentication, corporate establishment and digital asset management system in an Embodiment 1 of the present invention.

Reference numerals in the above figures are as follows:

10A, 10B, 10C Cross-border authentication, corporate establishment and digital asset management system
110 Information acquisition module
120 Certificate key acquisition module
130 Information authentication module
140 Electronic seal/electronic common seal/handwritten electronic signature generation module
150 Authorization module
160 Multi-language support module
170 IPv6 acquisition module
180 Binding module
200 Multi-module
210 Central control module
220 Communication module
230 Identity authentication module
240 Key module
250 Storage module
ID1-IDn Identity information
aID1-aIDn Authenticated identity information
eaID1-eaIDn Encrypted authenticated identity information
CI1-CIm Corporate information
aCI1-aCIm Authenticated corporate information
eaCI1-eaCIm Encrypted authenticated corporate information
Code_E Corporate code
DDAI1-DDAIx Domestic digital asset information
aDDAI1-aDDAIx Authenticated domestic digital asset information
ODAI1-ODAIy Overseas digital asset information
aODAI1-aODAIy Authenticated overseas digital asset information
DCAC1-DCACp Domestic CA certificate
DKEY1-DKEYp Domestic key
OCAC1-OCACp Overseas CA certificate
OKEY1-OKEYp Overseas key
EPS Electronic seal
ECS Electronic common seal
REQ1, REQ2 Application request
IPv6_ADD IPv6 digital address
BID Biometric data
aBID Authenticated biometric data
S610-S660, S710-S760 Step

DETAILED DESCRIPTION OF SOME EMBODIMENTS

In order to make the above and other objective, features and advantages of the present invention more obvious and easy to understand, preferred embodiments are listed below and described in detail as follows in cooperation with accompanying drawings.

To describe the embodiments of the present invention or the technical solutions in the prior art more clearly, the following briefly introduces the accompanying drawings required for describing the embodiments or the descriptions in the prior art. Apparently, the accompanying drawings in the following description show merely some embodiments of the present invention, and a person of ordinary skill in the art may still derive other drawings from these accompanying drawings without creative efforts.

The technical solutions in the embodiments of the present invention will be clearly and completely described as follows in combination with the drawings in the examples of the present invention, but obviously, the described examples are only a part of the embodiments of the present invention, rather than all the embodiments. Based on the examples of the present invention, all other examples obtained by a person skilled in the art without creative efforts shall fall within the protection scope of the present invention It is to be noted that in the description of the present invention, the terms "first", "second", etc. are only used for describing the objective and distinguish similar objects, and there is no order between the two, nor can they be understood to indicate or imply relative importance. In addition, in the description of the present invention, unless otherwise stated, "multiple" means two or more of them.

With reference to FIG. 1, FIG. 1 is a frame diagram of a cross-border authentication, corporate establishment and digital asset management system 10A in an Embodiment 1 of the present invention. As shown in FIG. 1, the cross-border authentication, corporate establishment and digital asset management system 10A includes an information acquisition module 110, a certificate key acquisition module 120, an information authentication module 130, an electronic seal/electronic common seal/handwritten electronic signature generation module 140, an authorization module 150 and a multi-module 200. The information acquisition module 110 is configured to acquire multiple user identity information ID1-IDn, multiple corporate information CI1-CIm, corporate codes Code_E, multiple domestic digital asset information DDAI1-DDAIx and multiple overseas digital asset information ODAI1-ODAIy. The certificate key acquisition module 120 is configured to acquire multiple domestic CA certificates DCAC1-DCACp and multiple domestic keys DKEY1-DKEYp provided by multiple domestic institutions (Certificate Authority), multiple overseas CA certificates OCAC1-OCACp and multiple overseas keys OKEY1-OKEYp provided by multiple overseas institutions. The information authentication module 130 is coupled to the information acquisition module 110 and the certificate key acquisition module 120, and is configured to carry out digital authentication on the multiple identity information ID1-IDn, the multiple corporate information CI1-CIm and the multiple domestic digital asset information DDAI1-DDAIx according to the multiple domestic CA certificates DCAC1-DCACp and the multiple domestic keys DKEY1-DKEYp so as to generate multiple authenticated identity information aID1-aIDn, multiple authenticated corporate information aCI1-aCIm and multiple authenticated domestic digital asset information aDDAI1-aDD AIx, and carry out digital authentication on the multiple overseas digital asset information ODAI1-O DAIy according to the multiple overseas CA certificates OCAC1-OCACp and the multiple overseas keys OKEY1-OKEYp to generate multiple authenticated overseas digital asset information aODAI 1-aODAIy. The electronic seal/electronic common seal/handwritten electronic signature generation module 140 is coupled to the information authentication module 130, and is configured to generate an electronic seal EPS, an electronic common seal ECS and a handwritten electronic signature of the user according to the multiple authenticated identity information aID1-aIDn and the multiple authenticated corporate information aCI1-aCIm of the user. The authorization module 150 is coupled to the electronic seal/electronic common seal/handwritten electronic signature generation module 140 and configured to allow the user to call the electronic seal EPS, the electronic common seal ECS and the handwritten electronic signature after authorization.

It is to be noted that the multiple identity information ID1-IDn can include ID card, address, email, telephone number and/or the video channel of an incorporator of the user, and the multiple corporate information CI1-CIm can include a bound telephone number, a bound bank account, an electronic business license, tax control information, a common seal number, a legal person certificate number, a unified social credit code and/or an electronic license number of a corporate user authorized by a bank system and/or government system, but it is only for example description, the present invention is not limited to this.

Figure 2:
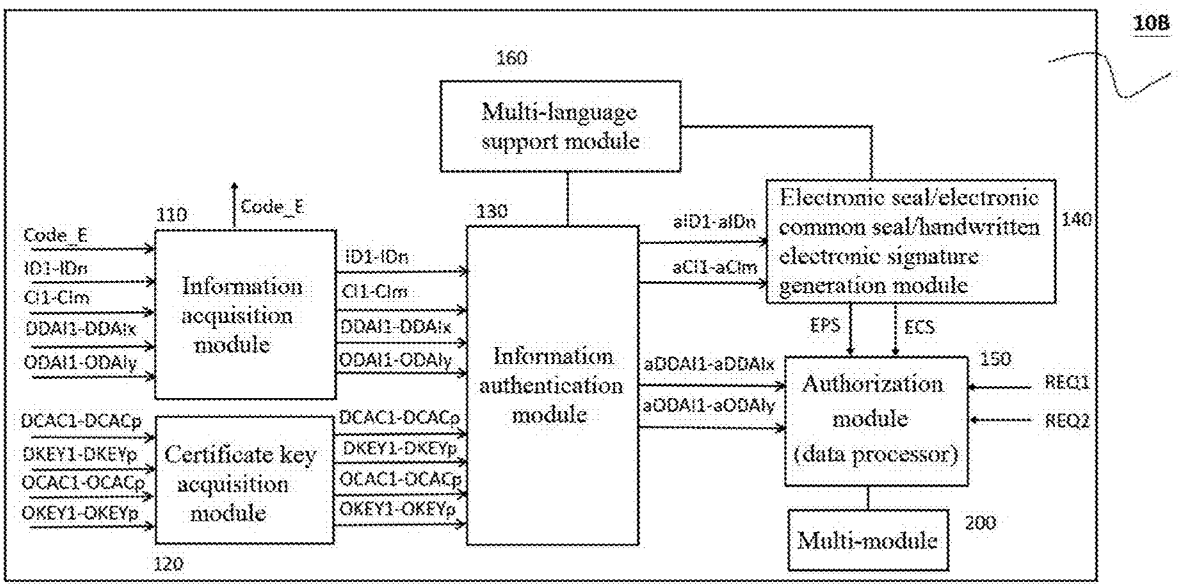
FIG. 2 is a frame diagram of a cross-border authentication, corporate establishment and digital asset management system in an Embodiment 2 of the present invention.

With reference to FIG. 2, FIG. 2 is a frame diagram of a cross-border authentication, corporate establishment and digital asset management system 10B in an Embodiment 2 of the present invention. The cross-border authentication, corporate establishment and digital asset management system 10B in FIG. 2 is similar to the cross-border authentication, corporate establishment and digital asset management system 10A in FIG. 1 by structure, and the difference is that the cross-border authentication, corporate establishment and digital asset management system 10B in FIG. 2 further includes a multi-language support module 60 which is configured to support language transformation of multiple national languages and multiple national language; the information authentication module 130 generates the multiple authenticated identity information aID1-aIDn, the multiple authenticated corporate information aCI1-aCIm and the multiple authenticated domestic digital asset information aDDAI1-aDDAIx by a first language, and generates the multiple authenticated overseas digital asset information aODAI1-aODAIy by a second language; and the second language is different from the first language. For example, the first language is Chinese, and the second language is English, French, German, Spanish or other languages. It is to be noted that the multi-language support module 160 is further coupled to the electronic seal/electronic common seal/handwritten electronic signature generation module 140. The electronic seal/electronic common seal/handwritten electronic signature generation module 140 generates an electronic seal EPS, an electronic common seal ECS and a handwritten electronic signature corresponding to the first language by adopting the first language (such as Chinese), and generates an electronic seal EPS, an electronic common seal ECS and a handwritten electronic signature corresponding to the second language by adopting the second language (such as English). Therefore, when the user makes an application request REQ1 corresponding to the first language, the authorization module 150 allows the user to call the electronic seal EPS, the electronic common seal ECS and the handwritten electronic signature corresponding to the first language after the user is authorized, so that domestic corporate establishment is realized, and the multiple authenticated domestic digital asset information aDDAI1-aDDAIx is acquired through the electronic seal EPS, the electronic common seal ECS and the handwritten electronic signature corresponding to the first language; and when the user makes an application request REQ2 corresponding to the second language, the authorization module 150 allows the user to call the electronic seal EPS, the electronic common seal ECS and the handwritten electronic signature corresponding to the second language after the user is authorized, so that overseas corporate establishment is realized, and the multiple authenticated overseas digital asset information aODAI1-aODAIy is acquired through the electronic seal EPS, the electronic common seal ECS and the handwritten electronic signature corresponding to the second language.

It is to be noted that the multiple domestic digital asset information DDAI1-DDAIx includes domestic electronic currency, domestic encrypted currency, domestic non-fungible token (NFT), domestic house property certificates and domestic electronic securities corresponding to the first language; and the multiple overseas digital asset information ODAI1-ODAIy includes overseas electronic currency, overseas encrypted currency, overseas non-fungible token, overseas house property certificates and overseas electronic securities corresponding to the second language, but it is only for example description, the present invention is not limited to this.

Figure 3:
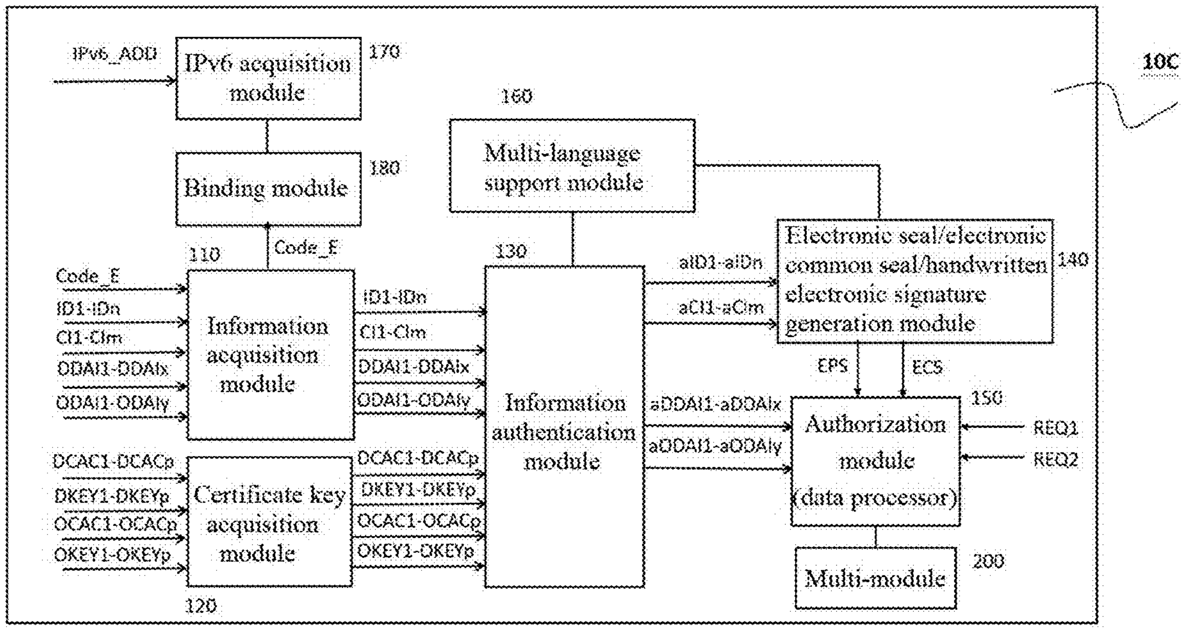
FIG. 3 is a frame diagram of a cross-border authentication, corporate establishment and digital asset management system in an Embodiment 3 of the present invention.

With reference to FIG. 3, FIG. 3 is a frame diagram of a cross-border authentication, corporate establishment and digital asset management system 10C in an Embodiment 3 of the present invention. The cross-border authentication, corporate establishment and digital asset management system 10C in FIG. 3 is similar to the cross-border authentication, corporate establishment and digital asset management system 10B in FIG. 2 by structure, and the difference is that the cross-border authentication, corporate establishment and digital asset management system 10C in FIG. 3 further includes an IPv6 acquisition module 170 and a binding module 180. The IPv6 acquisition module 170 is configured to acquire an IPv6 digital address IPv6_ADD of the user, and the IPv6 digital address includes multiple groups of 16-bit address fragments; and the binding module 180 is coupled to the information acquisition module 110 and the IPv6 acquisition module 170 and configured to bind the corporate code Code_E with the IPv6 digital address IPv6_ADD.

It is to be noted that the corporate code Code_E is bound by a fixed telephone number, and the fixed telephone number is a digital application conforming to the global financial security level. Therefore, the cross-border authentication, corporate development and digital asset management system 10A/10B/10C according to the present invention is a certificate-key linkage operation system for global digital application.

It is to be noted that the authorization module 150 in FIG. 1 to FIG. 3 substantially includes a data processor which can perform functions of processing, examining and approving, outputting and the like on domestic/overseas data, so that when the application request REQ1 corresponding to the first language is received, a data processing unit of the authorization module 150 can firstly process and examine and approve various required necessary domestic data, and after the user passes the authorization, the user is allowed to call the electronic seal EPS, the electronic common seal ECS and the handwritten electronic signature corresponding to the first language to realize domestic corporate establishment, and the multiple authenticated domestic digital asset information aDDAI1-aDDAIx is acquired through the electronic seal EPS, the electronic common seal ECS and the handwritten electronic signature corresponding to the first language; and similarly, when the application request REQ2 corresponding to the second language is received, the data processor of the authorization module 150 will firstly process and examine and approve various required necessary overseas data, and after the user passes the authorization, the user is allowed to call the electronic seal EPS, the electronic common seal ECS and the handwritten electronic signature corresponding to the second language to realize overseas corporate establishment, and the multiple authenticated overseas digital asset information aODAI1-aODAIx is acquired through the electronic seal EPS, the electronic common seal ECS and the handwritten electronic signature corresponding to the second language.

Figure 4:
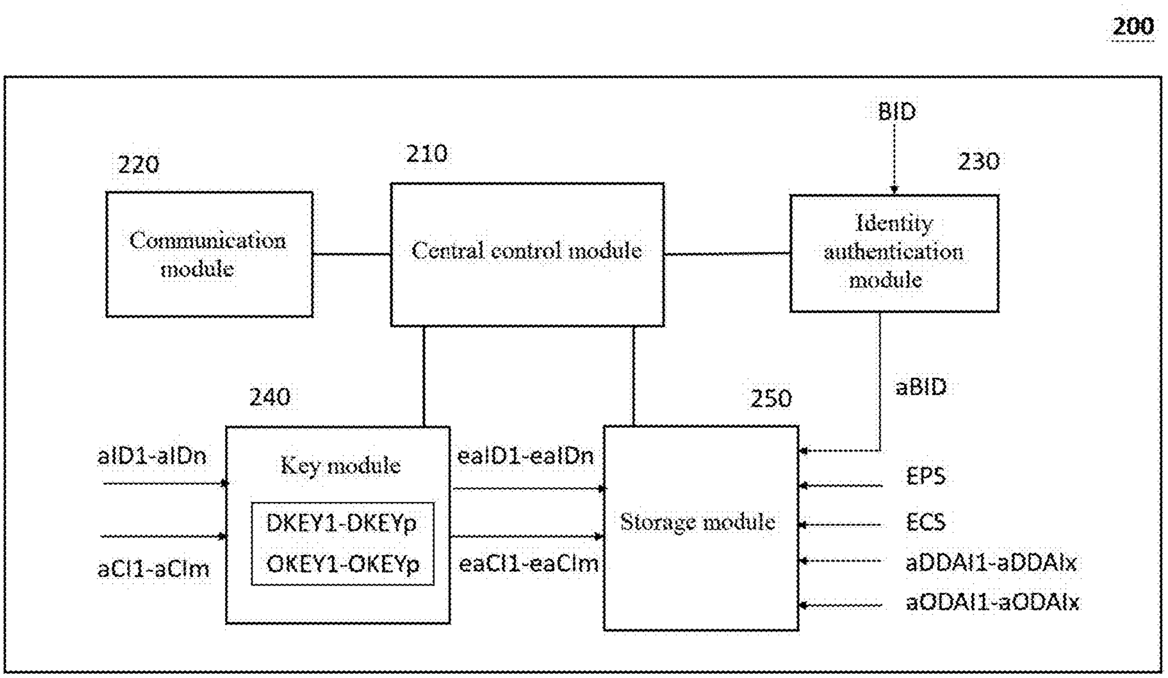
FIG. 4 is a frame diagram of a multi-module in FIG. 1, FIG. 2 and FIG. 3.

With reference to FIG. 1 to FIG. 3 and FIG. 4, the cross-border authentication, corporate development and digital asset management system 10A/10B/10C in FIG. 1 to FIG. 3 further includes a multi-module 200. As shown in FIG. 4, the multi-module 200 includes a central control module 210, and a communication module 220, an identity authentication module 230, a key module 240 and a storage module 250 which are connected to the central control module. The communication module 220 is configured to implement communication between the cross-border authentication, corporate establishment and digital asset management system 10A/10B/10C and an external server. The identity authentication module 230 is configured to authenticate biometric data BID inputted by the user to generate authenticated biometric data aBID, and authorize the user after authentication. The key module 240 is configured to store the multiple domestic keys DKEY1-DKEYp and the multiple overseas keys OKEY1-OKEYp, and encrypt the multiple authenticated identity information aID1-aIDn and the multiple authenticated corporate information aCI1-aCIm according to the multiple domestic keys DKEY1-DKEYp so as to generate multiple encrypted authenticated identity information eaID1-eaIDn and multiple encrypted authenticated corporate information eaCI1-eaCIm. The storage module 250 is configured to store the authenticated biometric data aBID, the multiple encrypted authenticated identity information eaID1-eaIDn, the multiple encrypted authenticated corporate information eaCI1-eaCIm, the electronic seal EPS, the electronic common seal ECS, the multiple authenticated domestic digital asset information aDDAI1-aDDAIx and the multiple authenticated overseas digital asset information aODAI1-aODAIy. The central control module 210 is configured to receive input and control operations of other modules 220-250, and allow the user to call the electronic seal EPS, the electronic common seal ECS and the handwritten electronic signature after authorization.

Further, the communication module 220 can include: at least one of a 3G communication module, a 4G communication module, a 5G communication module, a WIFI module, an NBIoT module, a Bluetooth module, an NFC module and an infrared module; and the communication module 220 supports IPv4 and IPv6 protocols.

It is to be noted that the biometric data BID can include fingerprint information data, palm print information data, iris information data and/or facial feature identification data, or any biological feature data capable of identifying the user. In practical application, one or a combination of more of the above data can be adopted for security identification. In addition, in the process of carrying out authentication by utilizing the biometric data BID, physical features and behavioral features need to be emphasized, the physical features include fingerprints, palm prints, palm shapes, irises, facial features, vocal prints, DNA and the like, and the behavioral features include walking postures, heartbeats, signatures and the like.

Figure 5:
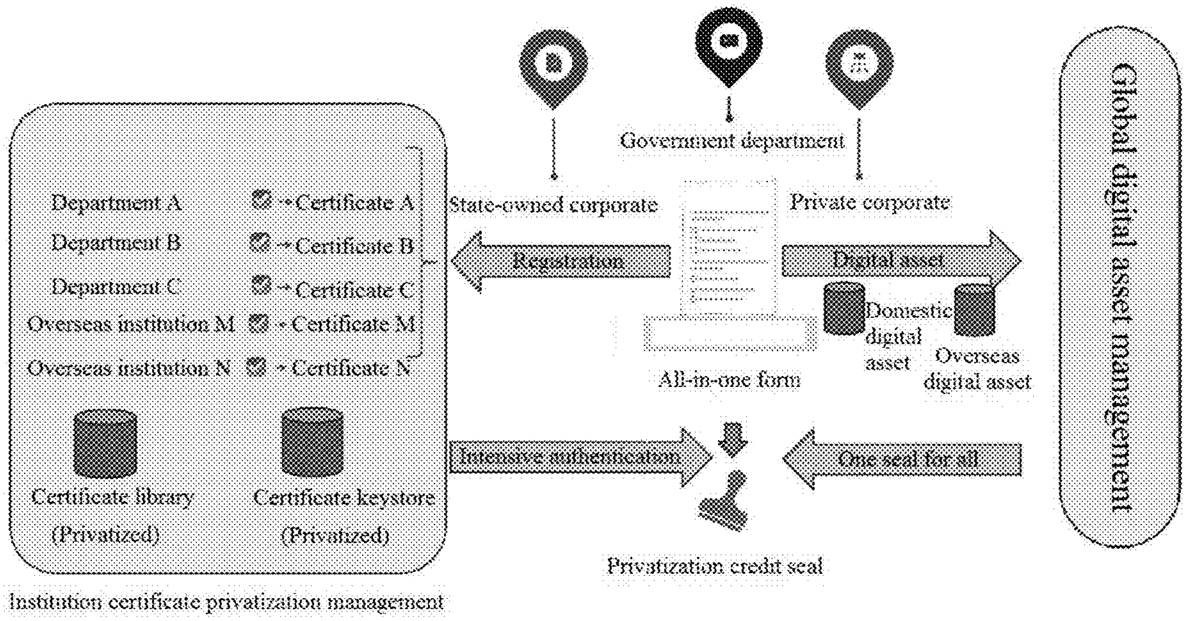
FIG. 5 is a schematic diagram of an overall solution of a cross-border authentication, corporate establishment and digital asset management system of the present invention.

With reference to FIG. 5, FIG. 5 is a schematic diagram of an overall solution of a cross-border authentication, corporate establishment and digital asset management system of the present invention. According to the cross-border authentication, corporate establishment and digital asset management system of the present invention, users (such as government departments, state-owned corporate, private corporate and self-employed entrepreneur) can fill information of all elements in the establishment stage; rules and technologies conforming to global market subject authentication and license issuing are fused; registration and intensive authentication work of domestic cross-border departments (such as department A, department B and department C) and overseas cross-regions (such as overseas organization M and overseas organization N) is completed in a one-stop mode; electronic licenses (such as licenses A, licenses B, licenses C, licenses M and licenses N) and corresponding related license keys are stored and managed in a privatization mode to form a license library and a license keystore; and privatization of the institution licenses and intensification of the licenses and the keys are completed in a multi-key mode of a domestic algorithm, an international algorithm and the like. In addition, according to the cross-border authentication, corporate establishment and digital asset management system of the present invention, after the registration is completed in the one-stop mode, intensive management of corporate credit element information and digital asset information is completed by uniformly managing domestic digital assets and overseas digital assets and calling the electronic seals EPS, the electronic common seals ECS and the handwritten electronic signatures through privatization credit seals, thus accumulation and right authentication of the digital assets are completed, and security management of the global digital assets is achieved.

In addition, in the circulation, transaction and application processes of digital assets, scenes such as data transmission, display and acceptance are certainly involved, and the globalized security management requirement is to be considered, so consumption and application of authorized data can be completed for daily domestic data trade in a credit authorization mode in combination with technical capabilities such as privacy computing and edge computing; at the domestic supervision level, supervision is opened through the authorization process and mechanism of the privatized data of the institution, and thus effective supervision of assets is promoted; and in the global cross-border trade stage, under the protection of completing the domestic security authorization mechanism, the exit use of the digital assets is completed through means such as exit data supervision report. Other aspects such as entry data circulation and overseas authentication and right confirmation data entry can adopt the same mechanism, and circulation can still be carried out through a channel of the platform under the condition of conforming to domestic and overseas related legal conditions.

It is to be noted that the present invention can not only achieve cross-border authentication, but also achieve cross-border registration and cross-border corporate establishment at the same time. According to the cross-border authentication, corporate establishment and digital asset management system of the present invention, through a global authentication mode (including domestic and overseas), on the premise of conforming to domestic and overseas laws and regulations, through one-stop editing and submitting of registration information in the system, a corporate establishment requirements corresponding to national authentication system and domestic market supervision and management can be automatically implemented at the background, and one-stop authentication and auditing for corporate establishment are completed. After a corporate completes registration and establishment, various authentication element information of the corporate is utilized to be intensive to a domestic standard full-element credit seal, and then one seal for all of the corporate can be achieved.

In other words, according to the cross-border authentication, corporate establishment and digital asset management system of the present invention, through establishment of digital devices conforming to privatization security environments of domestic and overseas password standard systems, privatized solidification of keys is completed for domestic certificates, overseas certificates, domestic electronic business licenses, bank account opening information, domestic digital asset information, overseas digital asset information and the like of the corporate, and thus one-time registration, intensive authentication and key integration of the corporate are achieved.

In addition, the corporate can also bind a globally approved fixed telephone number with a unique IPv6 digital address to serve as an identifier of the digital field, and the basic authentication capability is laid for next daily operation of the corporate.

The cross-border authentication, corporate establishment and digital asset management system according to the present invention can be a trusted authentication server system or a third-party authentication platform system, and a terminal apparatus includes authentication, storage, management and application of various certificate keys such as an electronic seal, and it corresponds to any department or platform system of social and economic transactions, including government, corporates, families and individuals.

The cross-border authentication, corporate establishment and digital asset management system 10A/10B/10C according to the present invention can be implemented by a chip of a material and electricity integrated intelligent electronic seal, the chip of the material and electricity integrated intelligent electronic seal stores various certificates and keys, and all the certificates and keys can be remotely distributed, downloaded, stored and applied.

Figure 6:
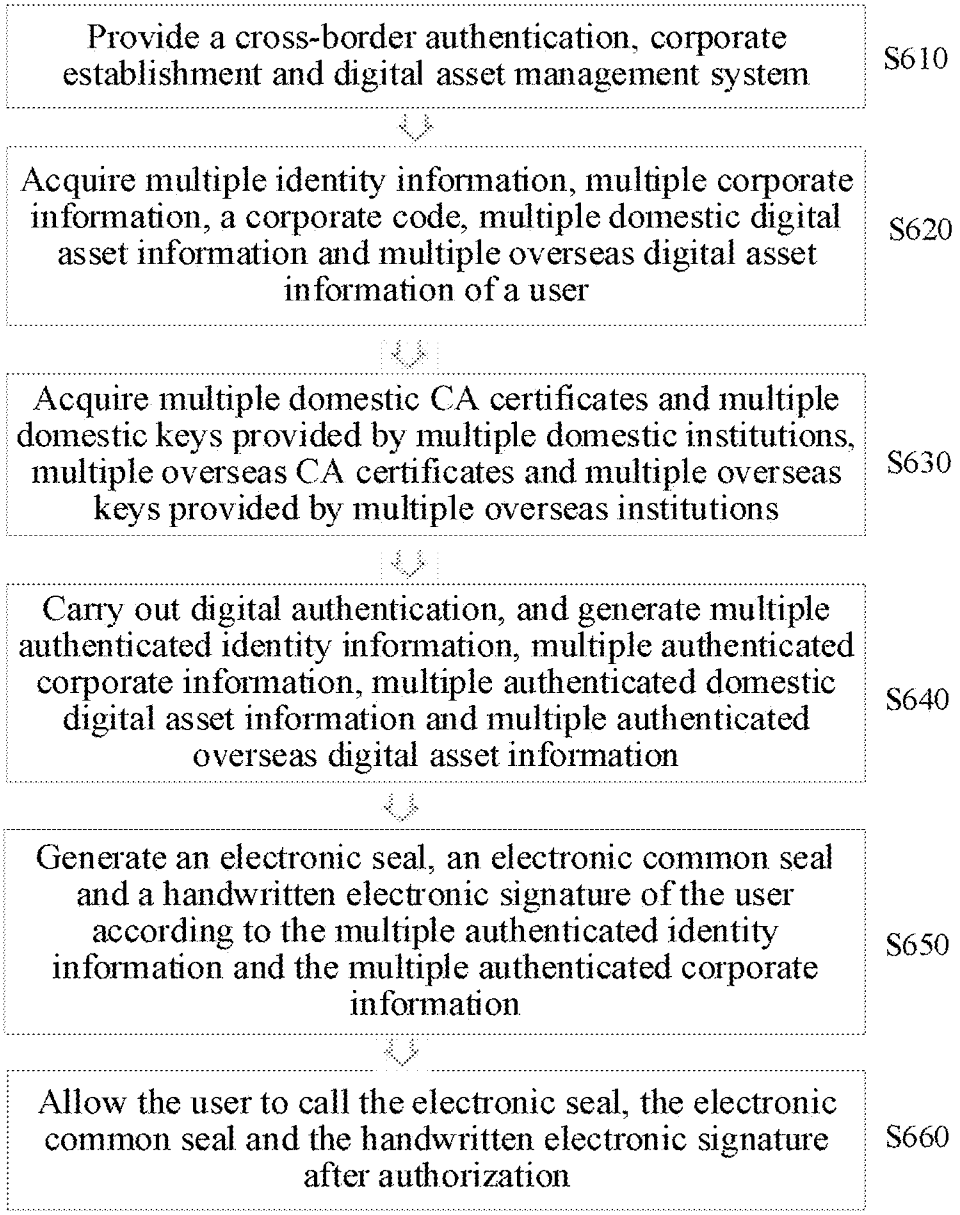
FIG. 6 is a flowchart of a cross-border authentication, corporate establishment and digital asset management method in an Embodiment 1 of the present invention.

With reference to FIG. 1 and FIG. 6, FIG. 6 is a flowchart of a cross-border authentication, corporate establishment and digital asset management method in an Embodiment 1 of the present invention. The cross-border authentication, corporate establishment and digital asset management method in FIG. 6 includes the following steps:

step S610: providing a cross-border authentication, corporate establishment and digital asset management system, in which the cross-border authentication, corporate establishment and digital asset management system includes an information acquisition module, a certificate key acquisition module, an information authentication module, an electronic seal/electronic common seal/handwritten electronic signature generation module and an authorization module;

step S620: acquiring multiple user identity information, multiple corporate information, corporate codes, multiple domestic digital asset information and multiple overseas digital asset information through the information acquisition module;

step S630: acquiring multiple domestic CA certificates and multiple domestic keys provided by multiple domestic institutions, multiple overseas CA certificates and multiple overseas keys provided by multiple overseas institutions through the certificate key acquisition module;

step S640: carrying out digital authentication on the multiple identity information, the multiple corporate information and the multiple domestic digital asset information according to the multiple domestic CA certificates and the multiple domestic keys through the information authentication module so as to generate multiple authenticated identity information, multiple authenticated corporate information and multiple authenticated domestic digital asset information, and carrying out digital authentication on the multiple overseas digital asset information according to the multiple overseas CA certificates and the multiple overseas keys to generate multiple authenticated identity information, multiple authenticated corporate information and multiple authenticated overseas digital asset information;

step S650: generating an electronic seal, an electronic common seal and a handwritten electronic signature of the user according to the multiple authenticated identity information and the multiple authenticated corporate information through the electronic seal/electronic common seal/handwritten electronic signature generation module; and step S660: allowing the user to call the electronic seal, the electronic common seal and the handwritten electronic signature after authorization through the authorization module.

It is to be noted that step S620 is performed through the information acquisition module 110; step S630 is performed through the certificate key acquisition module 120; step S640 is performed through the information authentication module 130; step S650 is performed through the electronic seal/electronic common seal/handwritten electronic signature generation module 140; and step S660 is performed through the authorization module 150.

With reference to FIG. 4 and FIG. 7, FIG. 7 is a flowchart of a cross-border authentication, corporate establishment and digital asset management method in an Embodiment 4 of the present invention. The cross-border authentication, corporate establishment and digital asset management method in FIG. 7 includes the following steps:

step S710: providing a central control module, and a communication module, an identity authentication module, a key module and a storage module which are connected to the central control module;

step S720: implementing communication between the cross-border authentication, corporate establishment and digital asset management system and an external server through the communication module;

step S730: authenticating biometric data inputted by the user to generate authenticated biometric data through the identity authentication module, and authorizing the user after authentication;

step S740: storing the multiple domestic keys and the multiple overseas keys through the key module, and encrypting the multiple authenticated identity information and the multiple authenticated corporate information according to the multiple domestic keys so as to generate multiple encrypted authenticated identity information and multiple encrypted authenticated corporate information;

step S750: storing the authenticated biometric data, the multiple encrypted authenticated identity information, the multiple encrypted authenticated corporate information, the electronic seal, the electronic common seal, the handwritten electronic signature, the multiple authenticated domestic digital asset information and the multiple authenticated overseas digital asset information through the storage module; and step S760: receiving input and controlling operations of other modules through the central control module, and allowing the user to call the electronic seal, the electronic common seal and the handwritten electronic signature after authorization.

It is to be noted that step S720 is performed through the communication module 220; step S730 is performed through the identity authentication module 230; step S740 is performed through the key module 240; step S750 is performed through the storage module 250; and step S760 is performed through the central control module 210.

With adoption of the cross-border authentication, corporate establishment and digital asset management system and method according to the specific embodiments of the present invention, intensive authentication and intensive elements of the terminals can be achieved at a corporate side; a government affairs platform, a government and corporate platform, an internet platform and a cross-border platform of all regions in the country are linked through application of the corporates; authentication is built in a unified but privatized environment, thus helping the corporates to directly establish linkage between authentication entrances and back ends; therefore, authentication result elements, various electronic certificates and various right authenticated digital assets needed by the corporates are subjected to local digital asset storage after authentication and verification by all the regions and all vertical departments, thus integrated management of the digital assets is realized, and the historical problem of interconnection and intercommunication is solved. The present invention can adapt to multi-authentication capacity under different legal environments, adopt language standards of different countries and implement seal or signature with different languages by different domestic and overseas signature and seal institutions in one protocol. In addition, the cross-border authentication, corporate establishment and digital asset management system according to the present invention performs privatization deployment through material and electricity integrated application, each intelligent terminal is an edge cloud integrating computation capability and storage; and each intelligent terminal includes a certificate-union credit server, an intelligent seal, a certificate-union set-top box, a certificate-union router, a certificate-union U key and the like, so that the problem that centralized deployment of private keys is unsafe can be solved. Furthermore, the cross-border authentication, corporate establishment and digital asset management system according to the present invention binds fixed telephone numbers and/or mobile phones, which can achieve the purpose that one number has multiple purposes and expands digital space, thus creating an integrated platform from authentication, credit enhancement, credit investigation to credibility, and realizing full life cycle management of domestic and overseas digital assets of governments, corporates, families, and individuals.

The embodiments of the present invention can be implemented in various hardware, software codes or a combination thereof. For example, the embodiment of the present invention can also be that the program cods of the above method is executed in a Digital Signal Processor (DSP). The present invention may also relate to various functions executed by a computer processor, the DSP, a microprocessor or a Field Programmable Gate Array (FPGA). The processor can be configured according to the present invention to execute a specific task, which can be implemented by executing a machine-readable software code or a firmware code defining the specific method disclosed by the present invention. The software code or the firmware code can be developed into different program languages and different formats or forms. The software code can also be compiled for different target platforms. However, different code styles, types and languages of the software code that performs the task according to the present invention and other types of configuration codes do not deviate from the spirit and scope of the present invention.

By means of the above technical solution, the present invention has the beneficial effects that: compared with the prior art, the cross-border authentication, corporate establishment and digital asset management system and method provided by the present invention have the advantages that: (1) through realizing full-element information filling in the establishment stage, the rules and technical capabilities conforming to global market subject authentication and license issuing are fused, and thus intensive authentication work of domestic cross-department and overseas cross-region is completed in the one-stop manner; (2) domestic and overseas multi-certificate and multi-key application issuing can be completed on a single platform through one-time authentication; (3) cross-border registration can be realized, and domestic corporate establishment and overseas corporate establishment can be completed in the one-stop manner; and (4) through unified management of the domestic digital assets and the overseas digital assets, intensive management of corporate credit element information and digital asset information is completed, and the accumulation and right authentication of the digital assets are completed. In other words, the cross-border authentication, corporate establishment and digital asset management system according to the present invention not only can meet rule adaptation of authentication requirements in different legal environments, but also can adapt to signature habits required by different language users for protocol signing, can help the corporates to efficiently communicate with overseas business partners, and realizes low-cost cross-border signing.

In the present invention, the principle and embodiment of the present invention have been elaborated by applying specific embodiments, and the description of the above embodiments is only used for helping understand the method of the present invention and its core idea; moreover, for those skilled in the art, according to the idea of the present invention, there will be changes in the specific embodiment and the scope of application, and in summary, the contents of the specification should not be understood as a restriction on the present invention.

The invention claimed is:

1. A cross-border authentication, corporate establishment and digital asset management system, comprising:

an information acquisition module, configured to acquire multiple user identity information, multiple corporate information, corporate codes, multiple domestic digital asset information and multiple overseas digital asset information;

a certificate key acquisition module, configured to acquire multiple domestic CA certificates and multiple domestic keys provided by multiple domestic institutions, multiple overseas CA certificates and multiple overseas keys provided by multiple overseas institutions;

an information authentication module which is coupled to the information acquisition module and the certificate key acquisition module, and is configured to carry out digital authentication on the multiple identity information, the multiple corporate information and the multiple domestic digital asset information according to the multiple domestic CA certificates and the multiple domestic keys so as to generate multiple authenticated identity information, multiple authenticated corporate information and multiple authenticated domestic digital asset information, and carry out digital authentication on the multiple overseas digital asset information according to the multiple overseas CA certificates and the multiple overseas keys to generate multiple authenticated overseas digital asset information;

a multi-language support module configured to support language transformation of multiple languages;

an electronic seal/electronic common seal/handwritten electronic signature generation module which is coupled to the information authentication module and the multi-language support module, and is configured to generate an electronic seal, an electronic common seal and a handwritten electronic signature of the user according to the multiple authenticated identity information and the multiple authenticated corporate information; and an authorization module which is coupled to the electronic seal/electronic common seal/handwritten electronic signature generation module and configured to allow the user to call the electronic seal, the electronic common seal and the handwritten electronic signature after authorization;

wherein the information authentication module generates the multiple authenticated identity information, the multiple authenticated corporate information and the multiple authenticated domestic digital asset information by a first language, and generates the multiple authenticated overseas digital asset information by a second language different from the first language;

wherein when the user makes an application request corresponding to the first language, the authorization module allows the user to call the electronic seal, the electronic common seal and the handwritten electronic signature corresponding to the first language after the user is authorized, SO that domestic corporate establishment is realized, and the multiple authenticated domestic digital asset information is acquired through the electronic seal, the electronic common seal and the handwritten electronic signature corresponding to the first language; and wherein when the user makes an application request corresponding to the second language, the authorization module allows the user to call the electronic seal, the electronic common seal and the handwritten electronic signature corresponding to the second language after the user is authorized, SO that overseas corporate establishment is realized, and the multiple authenticated overseas digital asset information is acquired through the electronic seal, the electronic common seal and the handwritten electronic signature corresponding to the second language;

wherein each of the information acquisition module, the certificate key acquisition module, the information authentication module, the multi-language support module, the electronic seal/electronic common seal/handwritten electronic signature generation module, and the authorization module is embodied by at least one processor and at least one memory coupled to the at least one processor, the at least one memory storing a computer program that, when executed by the at least one processor, causes the at least one processor to implement the functions of the corresponding module.

2. The cross-border authentication, corporate establishment and digital asset management system according to claim 1, wherein the multi-language support module is further coupled to the electronic seal/electronic common seal/handwritten electronic signature generation module; and the electronic seal/electronic common seal/handwritten electronic signature generation module generates an electronic seal, an electronic common seal and a handwritten electronic signature corresponding to the first language by adopting the first language, and generates an electronic seal, an electronic common seal and a handwritten electronic signature corresponding to the second language by adopting the second language.

3. The cross-border authentication, corporate establishment and digital asset management system according to claim 1, wherein the multiple domestic digital asset information comprises domestic electronic currency, domestic encrypted currency, domestic non-fungible token, domestic house property certificates and domestic electronic securities corresponding to the first language; and the multiple overseas digital asset information comprises overseas electronic currency, overseas encrypted currency, overseas non-fungible token, overseas house property certificates and overseas electronic securities corresponding to the second language.

4. The cross-border authentication, corporate establishment and digital asset management system according to claim 1, further comprising:

an IPv6 acquisition module, configured to acquire an IPv6 digital address of the user, wherein the IPv6 digital address comprises multiple groups of 16-bit address fragments; and a binding module which is coupled to the information acquisition module and the IPv6 acquisition module and configured to bind the corporate codes with the IPv6 digital address;

wherein each of the IPv6 acquisition module and the binding module is embodied by at least one processor and at least one memory coupled to the at least one processor, the at least one memory storing a computer program that, when executed by the at least one processor, causes the at least one processor to implement the functions of the corresponding module.

5. The cross-border authentication, corporate establishment and digital asset management system according to claim 1, further comprising a multi-module which is coupled to the information authentication module and the electronic seal/electronic common seal/handwritten electronic signature generation module, wherein the multi-module comprises:

a central control module, and a communication module, an identity authentication module, a key module and a storage module which are connected to the central control module;

the communication module is configured to implement communication between the cross-border authentication, corporate establishment and digital asset management system and an external server;

the identity authentication module is configured to authenticate biometric data inputted by the user to generate authenticated biometric data, and authorize the user after authentication;

the key module is configured to store the multiple domestic keys and the multiple overseas keys, and encrypt the multiple authenticated identity information and the multiple authenticated corporate information according to the multiple domestic keys and the multiple overseas keys so as to generate multiple encrypted authenticated identity information and multiple encrypted authenticated corporate information;

the storage module is configured to store the authenticated biometric data, the multiple encrypted authenticated identity information, the multiple encrypted authenticated corporate information, the electronic seal, the electronic common seal, the handwritten electronic signature, the multiple authenticated domestic digital asset information and the multiple authenticated overseas digital asset information; and the central control module is configured to receive input and control operations of other modules, and allow the user to call the electronic seal, the electronic common seal and the handwritten electronic signature after authorization;

wherein each of the central control module, the communication module, the identity authentication module, the key module, and the storage module is embodied by at least one processor and at least one memory coupled to the at least one processor, the at least one memory storing a computer program that, when executed by the at least one processor, causes the at least one processor to implement the functions of the corresponding module.

6. A cross-border authentication, corporate establishment and digital asset management method, applying to a cross-border authentication, corporate establishment and digital asset management system, and comprising the following steps:

providing the cross-border authentication, corporate establishment and digital asset management system, wherein the cross-border authentication, corporate establishment and digital asset management system comprises an information acquisition module, a certificate key acquisition module, an information authentication module, a multi-language support module, an electronic seal/electronic common seal/handwritten electronic signature generation module and an authorization module;

acquiring multiple user identity information, multiple corporate information, corporate codes, multiple domestic digital asset information and multiple overseas digital asset information through the information acquisition module;

acquiring multiple domestic CA certificates and multiple domestic keys provided by multiple domestic institutions, multiple overseas CA certificates and multiple overseas keys provided by multiple overseas institutions through the certificate key acquisition module;

carrying out digital authentication on the multiple identity information, the multiple corporate information and the multiple domestic digital asset information according to the multiple domestic CA certificates and the multiple domestic keys through the information authentication module so as to generate multiple authenticated identity information, multiple authenticated corporate information and multiple authenticated domestic digital asset information, and carrying out digital authentication on the multiple overseas digital asset information according to the multiple overseas CA certificates and the multiple overseas keys to generate multiple authenticated overseas digital asset information;

supporting, through the multi-language support module, language transformation of multiple languages;

generating an electronic seal, an electronic common seal and a handwritten electronic signature of the user according to the multiple authenticated identity information and the multiple authenticated corporate information through the electronic seal/electronic common seal/handwritten electronic signature generation module; and allowing the user to call the electronic seal, the electronic common seal and the handwritten electronic signature after authorization through the authorization module;

wherein the information authentication module generates the multiple authenticated identity information, the multiple authenticated corporate information and the multiple authenticated domestic digital asset information by a first language, and generates the multiple authenticated overseas digital asset information by a second language different from the first language;

wherein when the user makes an application request corresponding to the first language, the authorization module allows the user to call the electronic seal, the electronic common seal and the handwritten electronic signature corresponding to the first language after the user is authorized, so that domestic corporate establishment is realized, and the multiple authenticated domestic digital asset information is acquired through the electronic seal, the electronic common seal and the handwritten electronic signature corresponding to the first language;

wherein when the user makes an application request corresponding to the second language, the authorization module allows the user to call the electronic seal, the electronic common seal and the handwritten electronic signature corresponding to the second language after the user is authorized, SO that overseas corporate establishment is realized, and the multiple authenticated overseas digital asset information is acquired through the electronic seal, the electronic common seal and the handwritten electronic signature corresponding to the second language;

wherein each of the information acquisition module, the certificate key acquisition module, the information authentication module, the multi-language support module, the electronic seal/electronic common seal/handwritten electronic signature generation module, and the authorization module is embodied by at least one processor and at least one memory coupled to the at least one processor, the at least one memory storing a computer program that, when executed by the at least one processor, causes the at least one processor to implement the functions of the corresponding module.

7. The cross-border authentication, corporate establishment and digital asset management method according to claim 6, further comprising the following step:

generating an electronic seal, an electronic common seal and a handwritten electronic signature corresponding to the first language by adopting the first language, and generating an electronic seal, an electronic common seal and a handwritten electronic signature corresponding to the second language by adopting the second language through the electronic seal/electronic common seal/handwritten electronic signature generation module.

8. The cross-border authentication, corporate establishment and digital asset management method according to claim 6, further comprising the following steps:

the cross-border authentication, corporate establishment and digital asset management system further comprises a multi-module, and the multi-module comprises a central control module, and a communication module, an identity authentication module, a key module and a storage module which are connected to the central control module;

implementing communication between the cross-border authentication, corporate establishment and digital asset management system and an external server through the communication module; authenticating biometric data inputted by the user to generate authenticated biometric data through the identity authentication module, and authorizing the user after authentication;

storing the multiple domestic keys and the multiple overseas keys through the key module, and encrypting the multiple authenticated identity information and the multiple authenticated corporate information according to the multiple domestic keys and the multiple overseas keys so as to generate multiple encrypted authenticated identity information and multiple encrypted authenticated corporate information;

storing the authenticated biometric data, the multiple encrypted authenticated identity information, the multiple encrypted authenticated corporate information, the electronic seal, the electronic common seal, the handwritten electronic signature, the multiple authenticated domestic digital asset information and the multiple authenticated overseas digital asset information through the storage module; and receiving input and controlling operations of other modules through the central control module, and allowing the user to call the electronic seal, the electronic common seal and the handwritten electronic signature after authorization;

wherein each of the central control module, the communication module, the identity authentication module, the key module, and the storage module is embodied by at least one processor and at least one memory coupled to the at least one processor, the at least one memory storing a computer program that, when executed by the at least one processor, causes the at least one processor to perform the steps of the corresponding module.

* * * * *